United States Patent
Shimada et al.

(10) Patent No.: US 9,945,496 B2
(45) Date of Patent: Apr. 17, 2018

(54) AUTOMATIC TRANSMISSION CONTROL VALVE BODY STRUCTURE

(71) Applicant: JATCO LTD, Fuji-shi, Shizuoka (JP)

(72) Inventors: Masaru Shimada, Shizuoka (JP); Hideki Ishii, Numazu (JP); Masato Urushibata, Fuji (JP); Akio Nonomura, Isehara (JP); Kenji Matsumoto, Shizuoka (JP); Hideki Nakazawa, Fuji (JP)

(73) Assignee: JATCO Ltd, Fuji-Shi (JP)

( * ) Notice: Subject to any disclaimer, the term of this patent is extended or adjusted under 35 U.S.C. 154(b) by 0 days.

(21) Appl. No.: 15/249,651

(22) Filed: Aug. 29, 2016

(65) Prior Publication Data

US 2016/0363239 A1 Dec. 15, 2016

Related U.S. Application Data

(62) Division of application No. 14/375,253, filed as application No. PCT/JP2013/051442 on Jan. 24, 2013, now abandoned.

(30) Foreign Application Priority Data

Jan. 31, 2012 (JP) ................ 2012-017950

(51) Int. Cl.
*F16K 47/08* (2006.01)
*F15B 21/00* (2006.01)
(Continued)

(52) U.S. Cl.
CPC ............ *F16K 47/08* (2013.01); *F15B 13/081* (2013.01); *F15B 13/0871* (2013.01);
(Continued)

(58) Field of Classification Search
CPC ........ F16K 47/08; F16K 31/06; F15B 13/081; F15B 13/0871; F15B 21/008; F16H 61/0009; F16H 61/0265; F16H 61/0276
See application file for complete search history.

(56) References Cited

U.S. PATENT DOCUMENTS 1,751,261 A * 3/1930 Wilson ................ F16F 1/08
267/166.1
3,108,611 A 10/1963 Ketler, Jr.
(Continued)

FOREIGN PATENT DOCUMENTS

JP 59-036814 U 3/1984
JP 63-101355 U 7/1988
(Continued)

*Primary Examiner* — Michael A Riegelman
(74) *Attorney, Agent, or Firm* — Foley & Lardner LLP

(57) ABSTRACT

Structure of control valve body of automatic transmission has valve body enclosures having channels on opposing surfaces thereof; a separate plate sandwiched between the valve body enclosures for defining oil passages on both sides of the separate plate; and an orifice provided at the separate plate. The oil passages on both sides of the separate plate, which are upstream and downstream side oil passages located on upstream and downstream sides of the separate plate, communicate with each other through the orifice. Depth h, in a part facing to the orifice, of the channel corresponding to the downstream side oil passage is set to be shallower than depth of the channel corresponding to the upstream side oil passage, and the depth h of the channel in the part facing to the orifice and a diameter d of the orifice are set so as to satisfy relationship of h≤3d.

5 Claims, 6 Drawing Sheets

(51) Int. Cl.
*F16H 61/00* (2006.01)
*F16H 61/02* (2006.01)
*F16K 31/06* (2006.01)
*F15B 13/08* (2006.01)

(52) U.S. Cl.
CPC ....... *F15B 21/008* (2013.01); *F16H 61/0009* (2013.01); *F16H 61/0265* (2013.01); *F16H 61/0276* (2013.01); *F16K 31/06* (2013.01); *B60Y 2306/09* (2013.01); *F16H 2061/0279* (2013.01)

(56) References Cited

U.S. PATENT DOCUMENTS

| | | |
|---|---|---|
| 3,463,182 A | 8/1969 | Evans |
| 3,718,152 A | 2/1973 | Kraakman |
| 3,779,274 A | 12/1973 | Kelly |
| 3,971,541 A * | 7/1976 | Griffin ................ F16K 31/445 251/320 |
| 4,022,244 A | 5/1977 | Oman |
| 5,585,011 A | 12/1996 | Saaski |
| 5,947,482 A | 9/1999 | Iwata |
| 5,950,678 A | 9/1999 | Shimoyama |
| 6,681,762 B1 | 1/2004 | Scheuch |
| 6,752,577 B2 * | 6/2004 | Chen .......................... G06F 1/20 165/80.3 |
| 7,942,245 B2 | 5/2011 | Shimizu et al. |
| 8,714,201 B2 | 5/2014 | Teng |
| 9,127,783 B2 | 9/2015 | Perozziello |
| 2002/0117643 A1 | 8/2002 | Winger |
| 2005/0257839 A1* | 11/2005 | Kaneko ................... F16K 24/04 137/587 |
| 2006/0049084 A1 | 3/2006 | Suzuki et al. |
| 2006/0231339 A1 | 10/2006 | Enomoto |
| 2008/0035875 A1 | 2/2008 | Tai |
| 2008/0042092 A1* | 2/2008 | Endoh ................ F02M 37/0029 251/337 |
| 2008/0236952 A1 | 10/2008 | Shimizu et al. |
| 2011/0120933 A1 | 5/2011 | Ishll |

FOREIGN PATENT DOCUMENTS

| | | |
|---|---|---|
| JP | 02-098253 U | 8/1990 |
| JP | H09-257129 A | 9/1997 |
| JP | 09-269065 A | 10/1997 |
| JP | 2007-127190 A | 5/2007 |
| JP | 2008-248923 A | 10/2008 |
| WO | WO-2010/058800 A1 | 5/2010 |

* cited by examiner

AUTOMATIC TRANSMISSION CONTROL VALVE BODY STRUCTURE

CROSS-REFERENCE TO RELATED APPLICATIONS

The present application is a divisional application of U.S. application Ser. No. 14/375,253, filed Jul. 29, 2014, which is a National Stage of International Application No. PCT/JP2013/051442, filed Jan. 24, 2013, which claims the benefit of priority from Japanese Patent Application No. 2012-017950, filed Jan. 31, 2012; the entire contents of all of which are incorporated herein by reference.

TECHNICAL FIELD

The present invention relates to a structure of a control valve body of an automatic transmission, and more particularly to a structure of anti-vibration measures of a separate plate of the control valve body.

BACKGROUND ART

FIG. 6 is a drawing for explaining an outline of an oil passage in a control valve body of an automatic transmission for a vehicle in a related art. FIG. 6(a) is a sectional view schematically showing the oil passage in the control valve body. FIG. 6(b) is a sectional view taken along an A-A line of FIG. 6(a). FIG. 6(c) is an enlarged view of an area B in FIG. 6(a), for explaining vibration of a separate plate. FIG. 6(d) is an enlarged explanatory view of an orifice adjacent area of the separate plate.

The control valve body of the vehicle automatic transmission has a basic structure in which a separate plate 120 is sandwiched between valve body enclosures 100 and 110 which are coupled together. The valve body enclosures 100 and 110 have, on opposing surfaces thereof, channels 100a and 110a. Openings of these channels 100a and 110a are closed with the separate plate 120 sandwiched between the valve body enclosures 100 and 110, thereby separating the channels 100a and 110a and defining oil passages 101 and 102 in which working fluid flows.

The control valve body is provided with a solenoid, a spool (both not shown), etc. besides the oil passage inside the control valve body. The vehicle automatic transmission is configured so that the working fluid is supplied to a certain frictional engagement element by switching or changing the oil passage that provides the working fluid by driving the solenoid and the spool.

In the control valve body, there is a spot by which one side oil passage 101 and the other side oil passage 102 sandwiching the separate plate 120 communicate with each other through an orifice 121 that is provided at the separate plate 120. For instance, the working fluid in the one side oil passage 101 is pushed out to the other side oil passage 102 through the orifice 121 of this spot.

Here, the working fluid pushed out to the oil passage 102 through the orifice 121 moves along a center axis X of the orifice 121, and forms a flow F1 (see FIG. 6(c)) of the working fluid which flows on an extended line of the orifice 121 along the center axis X. Since there is a difference in a velocity of the flow between this working fluid flow F1 and a flow F2 of the working fluid positioned outside the extended line of the orifice 121, a vortex ring S caused by this flow velocity difference appears in the working fluid.

As shown in FIG. 6(b), since the orifice 121 is a small circular hole viewed from above, the vortex ring S formed in the oil passage 102 is formed cylindrically so as to surround the center axis X of the orifice 121. The vortex ring S formed in the oil passage 102 grows or develops while moving along the center axis X in a direction moving away from the orifice 121. Then, finally, a plurality of the vortex rings S continuously appear with the center axis X being a coaxial axis in a penetration direction (in an axial direction of the center axis X) of the orifice 121.

Here, the vortex ring S is a vortex that is different from a so-called Karman vortex. The vortex ring S is a vortex that is generated, caused by the orifice 121 of the separate plate 120, in the downstream side oil passage 102, and is a vortex of a jet passing through the orifice 121 of the control valve body.

With respect to the vortex ring S continuously appearing in the penetration direction of the orifice 121, a pressure of a segment Sd between contiguous vortex rings S and S becomes higher than that of a core Sc of the vortex ring S. Because of this, when the working fluid in the oil passage 101 is pushed out to the oil passage 102 through the orifice 121, fluctuation in up-and-down directions in the pressure adjacent to the orifice 121 in the oil passage 102 repeatedly occurs due to the vortex ring S continuously appearing.

Here, a section 120a of the separate plate 120, which is adjacent to the orifice 121, is not supported by being sandwiched between the valve body enclosures 100 and 110, thus rigidity of the section 120a in the penetration direction of the orifice 121 (in a direction orthogonal to the separate plate 120) is low. Therefore, when the pressure adjacent to the orifice 121 in the oil passage 102 fluctuates in the up-and-down directions, the section 120a of the separate plate 120, which is adjacent to the orifice 121, vibrates in the penetration direction of the orifice 121 (see an arrow a in the drawing) due to this pressure fluctuation, then a noise resulting from this vibration might be generated.

As suppressing measures of the noise resulting from the vibration of the separate plate 120, as shown in FIG. 6(d), it is said that forming a cone surface 122 at a downstream side opening edge of the orifice 121 formed at the separate plate 120, for instance, by coining process is effective. This technique has been disclosed, for instance, in a Patent Document 1.

According to this structure, as shown in FIG. 6(d), by slowing down a flow F1' of the working fluid by the cone surface 122 and reducing a flow velocity difference between the working fluid flow F1' and the working fluid flow F2, the vibration at the section 120a of the separate plate 120, which is adjacent to the orifice 121, is suppressed, then the noise resulting from this vibration is suppressed.

However, only a flow velocity suppressing effect by the cone surface 122 is not adequate for the noise suppression. The vibration at the section 120a of the separate plate 120, which is adjacent to the orifice 121, and the generation of the noise resulting from this vibration are not adequately suppressed, and thus a further measurement is required.

CITATION LIST

Patent Document

Patent Document 1: Japanese Patent Provisional Publication No. 63-101355

SUMMARY OF THE INVENTION

The present invention was made in view of the above problem. An object of the present invention is to provide a structure that can adequately suppress the vibration at the section of the separate plate 120, which is adjacent to the orifice formed at the separate plate 120, and suppress the generation of the noise resulting from this vibration.

The present invention is, as described above, a structure of a control valve body of an automatic transmission, in which a separate plate is sandwiched between valve body enclosures. Then, channels are formed on opposing surfaces, which face to the separate plate, of the valve body enclosures located on both sides of the separate plate, and oil passages are defined by separating the channels by the separate plate, and one side oil passage and the other side oil passage located on both sides of the separate plate communicate with each other through an orifice that is provided at the separate plate. Further, in the valve body enclosure in which the channel that corresponds to a downstream side oil passage of the oil passages is formed, a depth, at least in a part facing to the orifice, of the channel is set to be shallower than a depth of the channel that corresponds to an upstream side oil passage of the oil passages, and the depth h of the channel in the part facing to the orifice and a diameter d of the orifice are set so as to satisfy a relationship of $h \leq 3d$.

According to the present invention, in the valve body enclosure in which the channel corresponding to the downstream side oil passage is formed, the depth h of the channel facing to the orifice is set to be shallower than a depth of the other channel, and also the depth his set, with respect to the diameter d of the orifice, so as to satisfy the relationship of $h \leq 3d$. Thus, the fluctuation in the up-and-down directions of the pressure adjacent to the orifice in the downstream side oil passage, which is caused by the vortex ring, can be prevented. It is therefore possible to prevent the section of the separate plate, which is adjacent to the orifice, from vibrating and prevent the noise resulting from this vibration from being generated.

EMBODIMENTS FOR CARRYING OUT THE INVENTION

Figure 1:
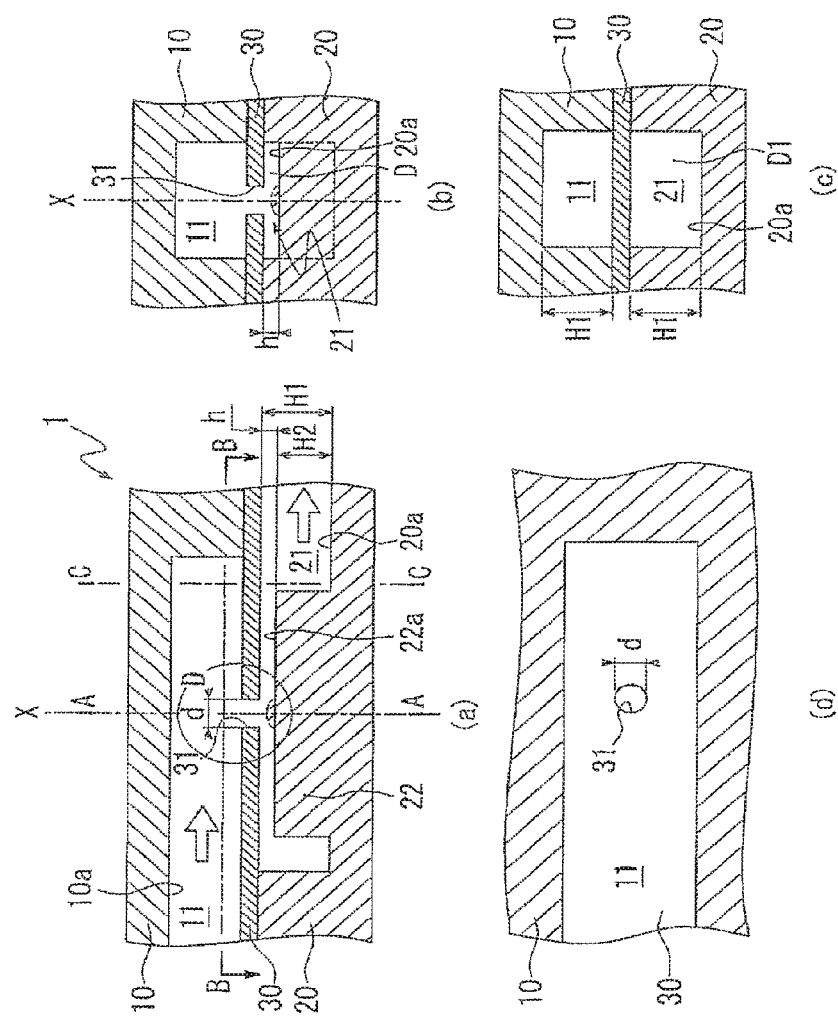
FIG. 1 is a sectional view showing a first embodiment of a control valve body structure according to the present invention.
Figure 2:
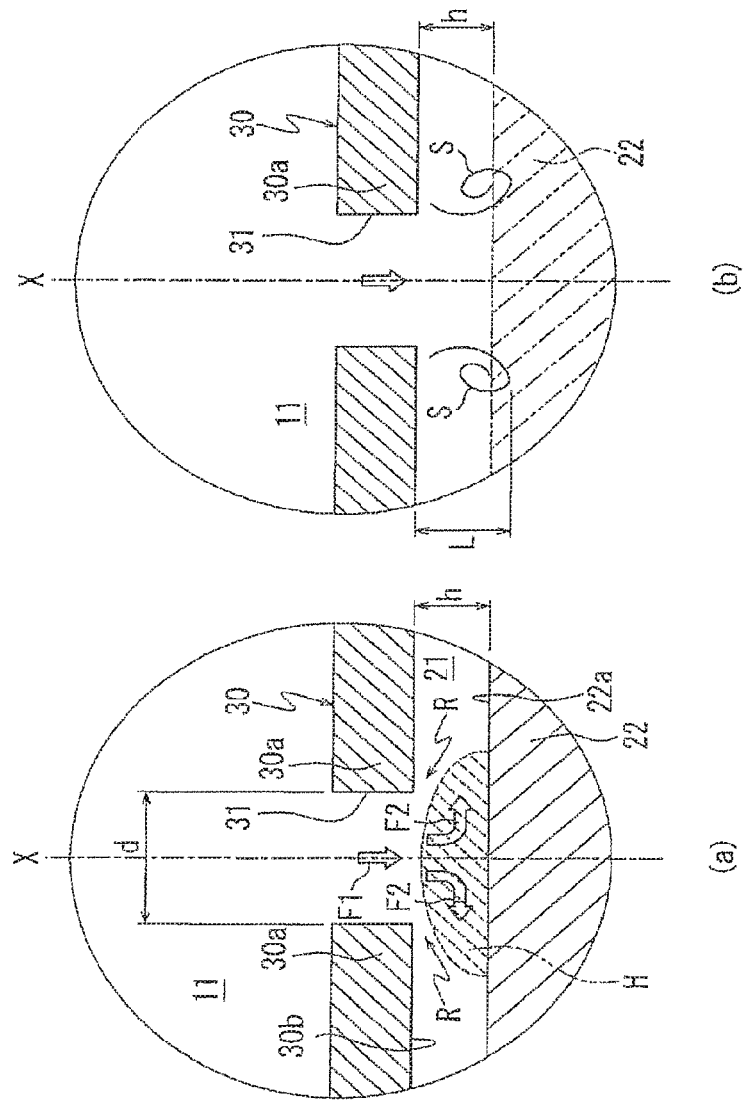
FIG. 2 is an enlarged view of a main part of FIG. 1.

FIG. 1 shows a first embodiment of a control valve body structure according to the present invention. FIG. 1(*a*) is a sectional view of the control valve body structure. FIG. 1(*b*) is a sectional view taken along an A-A line of FIG. 1(*a*). FIG. 1(*c*) is a sectional view taken along a C-C line of FIG. 1(*a*). FIG. 1(*d*) is a sectional view taken along a B-B line of FIG. 1(*a*). Further, FIG. 2(*a*) is an enlarged view of an area D of FIG. 1(*a*). FIG. 2(*b*) is a drawing for explaining formation of a vortex ring.

A control valve body 1 of an automatic transmission for a vehicle has a basic structure in which a separate plate 30 is sandwiched between valve body enclosures 10 and 20 which are coupled together. The valve body enclosures 10 and 20 have, on opposing surfaces thereof, channels 10*a* and 20*a*. Openings of these channels 10*a* and 20*a* are closed with the separate plate 30 sandwiched between the valve body enclosures 10 and 20, thereby separating the channels 10*a* and 20*a* and defining oil passages 11 and 21 in which working fluid flows.

In the control valve body, there is a spot by which one side oil passage 11 and the other side oil passage 21 sandwiching the separate plate 30 communicate with each other through an orifice 31 that is provided at the separate plate 30. For instance, the working fluid in the one side oil passage 11 moves to the other side oil passage 21 through the orifice 31 of this spot.

As shown in FIG. 1(*d*), the orifice 31 is formed into a small circular hole viewed from above, and has a diameter d. The orifice 31 is formed by penetrating the separate plate 30 in a thickness direction (in a coupling direction of the valve body enclosures 10 and 20). The working fluid coming from the oil passage 11 toward the oil passage 21 through the orifice 31 flows along a center axis X passing through a center of the orifice 31 in a penetration direction of the orifice 31 as shown by an arrow F1 in FIG. 2(*a*).

In the oil passage 21 located on a downstream side in a flow direction of the working fluid, a depth of the channel 20*a* of the valve body enclosure 20 defining the oil passage 21 is different between in an area facing to the orifice 31 and its adjacent area and in the other area. A depth h of the area facing to the orifice 31 and its adjacent area is shallower than a depth H1 of the other area. With this structure, as shown in FIGS. 1(*b*) and 1(*c*), in the oil passage 21, a passage cross-sectional area D of the area facing to the orifice 31 and its adjacent area is smaller than a passage cross-sectional area D1 of the other area.

In the present embodiment, a protruding section 22 that protrudes toward an opening side of the channel 20*a*, namely toward the orifice 31, is formed in the channel 20*a* of the valve body enclosure 20, then the depth of the channel 20*a* becomes shallower by this protruding section 22. The protruding section 22 is formed integrally with the valve body enclosure 20. The protruding section 22 is provided directly below the orifice 31 and in a predetermined area ranging from a position directly below the orifice 31 to upstream and downstream sides in a longitudinal direction (i.e. in right and left directions in FIG. 1(*a*)) of the channel 20*a* with a position of the orifice 31 being a reference. An opposing surface 22*a* of the protruding section 22, which faces to the separate plate 30, has a flat surface that is parallel to the separate plate 30, and this opposing surface 22*a* is orthogonal to the penetration direction of the orifice 31. That is, the opposing surface 22*a* is parallel to the separate plate 30 on which the orifice 31 is formed, and an area of the opposing surface 22*a* is wider than an area of the orifice 31 having the diameter d.

As shown in FIG. 2, in the present embodiment, the depth h from the orifice 31 (a lower surface 30*b* of the separate plate 30) to the opposing surface 22*a* is set to be smaller (shallower) than a distance L that is required for a vortex ring S to be formed in the penetration direction of the orifice 31 (in an orthogonal direction to the separate plate 30). Regarding this distance L, simulation and an experimental result showed that the distance L is dependent on the diameter d of the orifice 31 and if the distance L exceeds a distance that is three times that of the diameter d of the orifice 31, the vortex ring S is formed. Thus, in the present embodiment, as shown in FIG. 1(a), a protrusion height H2 of the protruding section 22 from a bottom of the channel 20a is set so as to satisfy a relationship of h≤3d (=L).

In the oil passage 21 having the protruding section 22, the working fluid flowing into the oil passage 21 through the orifice 31 and forming the flow (the arrow F1 in FIG. 2) toward the penetration direction of the orifice 31 in the oil passage 21 hits against or strikes the protruding section 22, and as shown by an arrow F2 in FIG. 2, the flow of the working fluid is bent or curved in a different direction from the penetration direction of the orifice 31.

As described above, the vortex ring S appears if the working fluid flows the predetermined distance L (=3d) or more along the penetration direction of the orifice 31. Thus, by setting the depth h from the orifice 31 to the opposing surface 22a in the above manner, the flow of the working fluid is disturbed before the vortex ring S is generated, the vortex ring can therefore be prevented from continuously appearing in the penetration direction of the orifice 31.

Further, as shown in FIG. 2, due to the fact that the working fluid passing through the orifice 31 strikes the opposing surface 22a, a high pressure area H whose pressure is higher than that of part where the protruding section 22 is not provided is formed directly below the orifice 31. Since this high pressure area H is formed directly below the orifice 31 and in its vicinity, a pressure of an area R which is adjacent to the orifice 31 in the oil passage 21 becomes high. Consequently, in this condition, the flow of the working fluid that newly passes through the orifice 31 and forms the flow F1 toward the penetration direction of the orifice 31 is impeded by the high pressure until the flow of the working fluid passes through the orifice 31 and reaches the high pressure area H, and its flow velocity decreases. With this working, since a flow velocity difference between the working fluid around the orifice 31 and the working fluid passing through the orifice 31 becomes small, an influence by the working fluid passing through the orifice 31 is lessened. Thus, even if a vortex flow (the vortex ring) is generated, it is generation of a weak or poor vortex. Hence, even if the vortex ring is formed in the oil passage 21, a size of the vortex formed in the oil passage 21 is small, which is caused by the fact that the flow velocity difference becomes small, as compared with a related art case where the high pressure area H is not formed.

Figure 6:
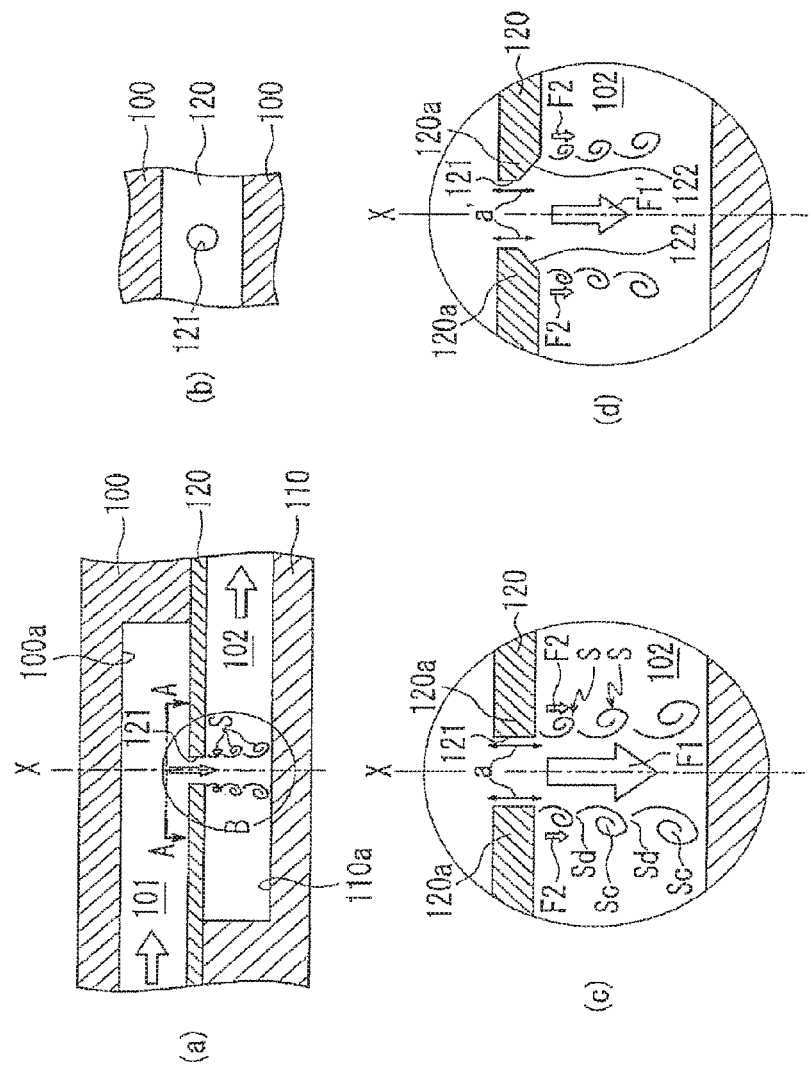
FIG. 6 is a sectional view for explaining an oil passage in the control valve body of an automatic transmission for a vehicle in a related art.

As a consequence, a difference between a pressure of a core of the vortex ring (see Sc in FIG. 6) and a pressure around the vortex ring (see Sd in FIG. 6) becomes small as compared with a case where the pressure of the adjacent area R is not high. With this working, even if the vortex ring continuously appears in the penetration direction of the orifice 31 in the oil passage 21, since a pressure on the lower surface 30b side of the separate plate 30 does not periodically widely fluctuate in the up-and-down directions, it is possible to suppress the vibration of a section 30a of the separate plate 30, which is adjacent to the orifice 31, and the generation of the noise caused by the vibration of the separate plate 30 can be suppressed.

As explained above, in the present embodiment, anti-vibration measures of the separate plate 30 in the control valve body 1 of the automatic transmission are premised on the structure in which the control valve body 1 is formed by sandwiching the separate plate 30 between the valve body enclosures 10 and 20 which are coupled together. Then, the openings of the channels 10a and 20a formed on the respective opposing surfaces of the valve body enclosures 10 and 20 are closed with the separate plate 30, and the oil passages 11 and 21 are formed on one side and the other side of the separate plate 30.

Further, one side oil passage 11 and the other side oil passage 21 located on opposite sides of the separate plate 30 communicate with each other through the orifice 31 provided at the separate plate 30. In addition, in the valve body enclosure 20 in which the channel 20a corresponding to the downstream side oil passage 21 of one side and the other side oil passages 11 and 21 is formed, the protruding section 22 protruding toward the opening side of the channel 20a is provided in the channel 20a, then the depth h of the area facing to the orifice 31 in the channel 20a is set to be shallower than the depth H1 of the other area where the protruding section 22 is not provided.

With this structure, since the depth of the channel 20a directly below the orifice 31 becomes shallower, the vortex ring is prevented from continuously appearing in the penetration direction of the orifice 31 in the downstream side oil passage 21. This can inhibit the pressure of the area R adjacent to the orifice 31 of the separate plate 30 from periodically fluctuating in the up-and-down directions in the downstream side oil passage 21, thereby preventing the generation of the noise caused by the fact that the section 30a of the separate plate 30, which is adjacent to the orifice 31, vibrates.

Further, only by setting the depth of the channel 20a of the valve body enclosure 20 to be shallow, the vibration of the section 30a of the separate plate 30, which is adjacent to the orifice 31, is suppressed and the noise resulting from the vibration can be suppressed. Therefore, there is no need for the control valve body to be machined more than necessary. As a consequence, the vibration and the generation of the noise resulting from the vibration can be suppressed without increasing a manufacturing cost.

In addition, the high pressure area H is formed directly below the orifice 31, and the flow velocity of the working fluid forming the flow F1 toward the penetration direction of the orifice 31 decreases, then the flow velocity difference between the working fluid forming the flow F1 and the working fluid flowing outside the area positioned directly below the orifice 31 becomes small. Thus, even if the vortex flow (the vortex ring) is generated in the oil passage 21, it is the generation of the weak or poor vortex, then the vortex ring formed in the oil passage 21 becomes small.

As a result, since the difference between the pressure of the core of the vortex ring and the pressure around the vortex ring is small, even if the vortex ring is continuously formed on the extended line of the orifice 31 in the oil passage 21, the pressure difference between the core of the vortex ring and a segment between contiguous vortex rings becomes small, thereby inhibiting the pressure on the lower surface 30b side of the separate plate 30 from periodically widely fluctuating in the up-and-down directions. It is therefore possible to suppress the vibration of the section 30a of the separate plate 30, which is adjacent to the orifice 31, and suppress the generation of the noise resulting from the vibration of the separate plate 30.

Furthermore, the relationship between the depth h from the orifice 31 to the opposing surface 22a (a bottom of the oil passage) of the protruding section 22 located directly below the orifice 31 and the diameter d of the orifice 31 is set so as to satisfy the relationship of h≤3d (=L), then the depth h is set to be smaller than or equal to the distance L that is required for a first vortex ring to be formed in the penetration direction of the orifice 31.

With these structure and setting, the depth of the channel 20*a* located directly below the orifice 31 becomes shallower than a depth required for the generation and the growth of the vortex ring, and flow of the working fluid is disturbed before the first vortex ring is generated directly below the orifice 31. This thus prevents the vortex ring from continuously appearing in the penetration direction of the orifice 31 in the oil passage 21.

Here, even if the vortex ring S is formed, since the moving or flowing direction of the working fluid passing through the orifice 31 is bent or curved by the opposing surface 22*a* of the protruding section 22, the vortex ring S does not grow and is not continuously formed in the penetration direction of the orifice 31.

Moreover, since the high pressure area H is formed directly below the orifice 31, the flow velocity of the working fluid forming the flow F1 toward the penetration direction of the orifice 31 decreases, then the flow velocity difference between the working fluid forming the flow F1 and the working fluid flowing outside the area positioned directly below the orifice 31 becomes small. Thus, even if the vortex flow (the vortex ring) is generated in the oil passage 21, it is the generation of the weak or poor vortex, then the vortex ring formed in the oil passage 21 becomes small.

As a result, since the difference between the pressure of the core of the vortex ring and the pressure around the vortex ring is small, even if the vortex ring is continuously formed on the extended line of the orifice 31 in the oil passage 21, the pressure difference between the core of the vortex ring and the segment between contiguous vortex rings becomes small, thereby inhibiting the pressure on the lower surface 30*b* side of the separate plate 30 from periodically widely fluctuating in the up-and-down directions.

Figure 3:
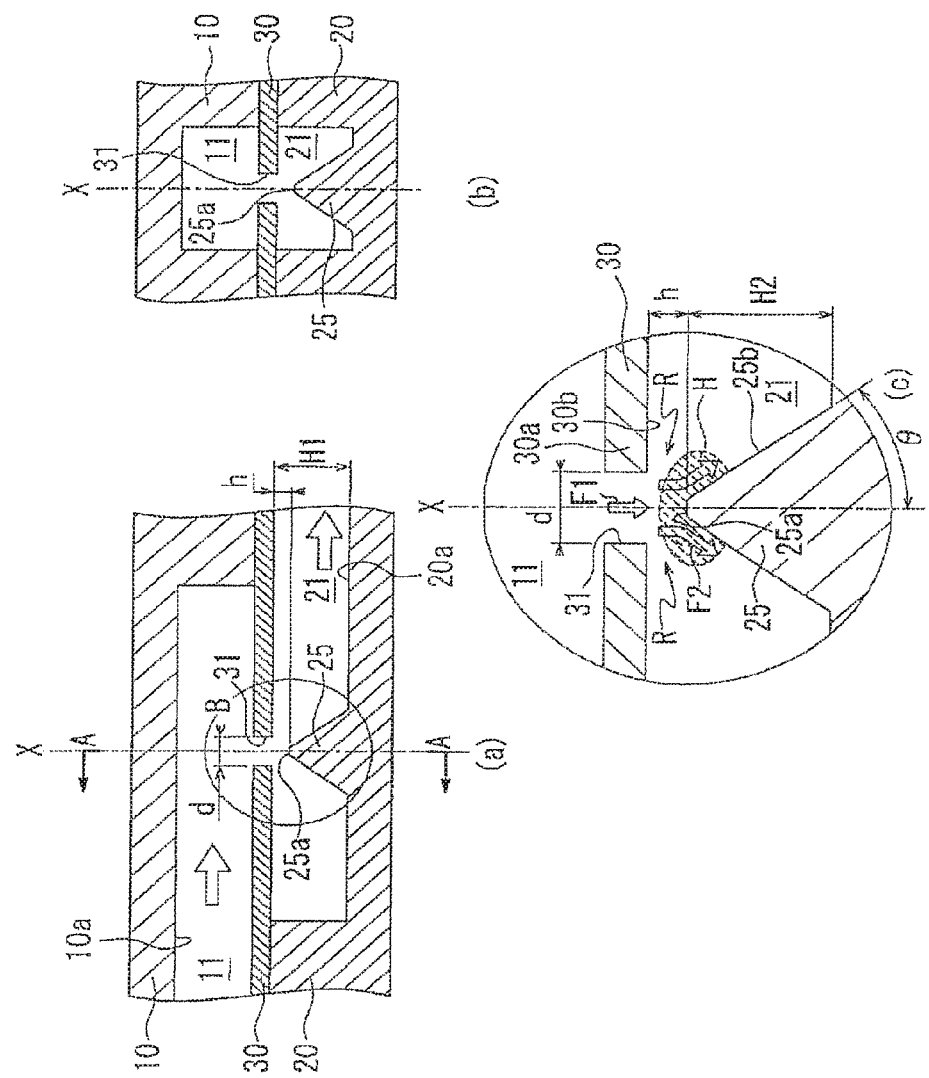
FIG. 3 is a sectional view showing a second embodiment of the control valve body structure according to the present invention.

Next, as a second embodiment, the other example of the protruding section in the downstream side oil passage will be explained. FIG. 3 is a drawing for explaining the protruding section according to the second embodiment. FIG. 3(*a*) is a sectional view of the control valve body when cut along the longitudinal direction of the oil passage 21. FIG. 3(*b*) is a sectional view taken along an A-A line of FIG. 3(*a*). FIG. 3(*c*) is an enlarged view of an area B of FIG. 3(*a*).

A protruding section 25 of the present embodiment has a circular truncated cone shape. The protruding section 25 is provided so that a top portion flat surface section 25*a* having a small diameter faces toward the orifice 31 side on the center axis X passing through the center of the orifice 31 and extending in the penetration direction of the orifice 31.

The top portion flat surface section 25*a* has a flat surface that is parallel to the separate plate 30, and is orthogonal to the moving or flowing direction (see an arrow F1 in the drawing) of the working fluid passing through the orifice 31. In the present embodiment, a depth h from the orifice 31 (the lower surface 30*b* of the separate plate 30) to the top portion flat surface section 25*a* is set to be smaller (shallower) than the distance L that is required for the first vortex ring to be formed in the penetration direction of the orifice 31. In the same manner as the first embodiment explained above, a protrusion height H2 of the protruding section 25 from a bottom of the channel 20*a* is set so as to satisfy the relationship of h≤3d (=L). Here, as can be seen from FIG. 3, an area of the top portion flat surface section 25*a* of the protruding section 25 is smaller than an area of the orifice 31 having the diameter d.

An outer peripheral surface 25*b* of the protruding section 25 is inclined at a predetermined angle θ with respect to the center axis X. The working fluid flowing into the oil passage 21 through the orifice 31 is guided in a direction moving away from the center axis X by this outer peripheral surface 25*b*, then the working fluid flow is converted to a flow of a direction which radially expands or spreads when viewed from the center axis X.

In the oil passage 21 having the protruding section 25, the flow (see the arrow F1 in FIG. 3(*c*)) of the working fluid flowing into the oil passage 21 through the orifice 31 is interfered by the protruding section 25, and is bent or curved in a different direction from the penetration direction of the orifice 31 (see an arrow F2).

Here, since the depth h from the orifice 31 (the lower surface 30*b* of the separate plate 30) to the top portion flat surface section 25*a*, which is the narrowest separation distance between the orifice 31 (the lower surface 30*b* of the separate plate 30) and the protruding section 25, is set to be smaller (shallower) than the distance L that is required for the first vortex ring to be formed in the penetration direction of the orifice 31 (i.e. h≤3d), the flow of the working fluid is disturbed before the vortex ring is generated. It is therefore possible to prevent the vortex ring from continuously appearing in the penetration direction of the orifice 31 and prevent the vortex ring from growing.

Further, also in the case of the protruding section 25, since the high pressure area H is formed directly below the orifice 31, even if the vortex flow (the vortex ring) is generated in the oil passage 21, it is the generation of the weak or poor vortex, then the vortex ring formed in the oil passage 21 becomes small. Therefore, since the difference between the pressure of the core of the vortex ring and the pressure around the vortex ring is small, even if the vortex ring is continuously formed on the extended line of the orifice 31 in the oil passage 21, the pressure difference between the core of the vortex ring and the segment between contiguous vortex rings becomes small, thereby inhibiting the pressure on the lower surface 30*b* side of the separate plate 30 from periodically widely fluctuating in the up-and-down directions.

As explained above, the second embodiment has the structure in which the circular truncated cone-shaped protruding section 25 is formed in the position directly below the orifice 31 in the channel 20*a* with the top portion flat surface section 25*a* facing toward the orifice 31 side, and the depth h from the orifice 31 (the lower surface 30*b* of the separate plate 30) to the top portion flat surface section 25*a* is set to be smaller (shallower) than a depth H1 of the other area where the protruding section 25 is not provided.

Also with this structure, since the vortex ring is prevented from continuously appearing in the penetration direction of the orifice 31 and the pressure of the area R adjacent to the orifice 31 of the separate plate 30 is inhibited from periodically fluctuating in the up-and-down directions in the downstream side oil passage 21, the generation of the noise caused by the fact that the section 30*a* of the separate plate 30, which is adjacent to the orifice 31, vibrates can be prevented.

Here, although the present embodiment shows, as an example, the circular truncated cone-shaped protruding section 25, a conical shape or a cylindrical shape could be possible. Further, polygonal pyramid shape, polygonal truncated pyramid shape and polygonal prism shape such as quadrangular pyramid, truncated square pyramid and quadrangular prism could be possible. Also in this case, the same effect can be obtained.

Figure 4:
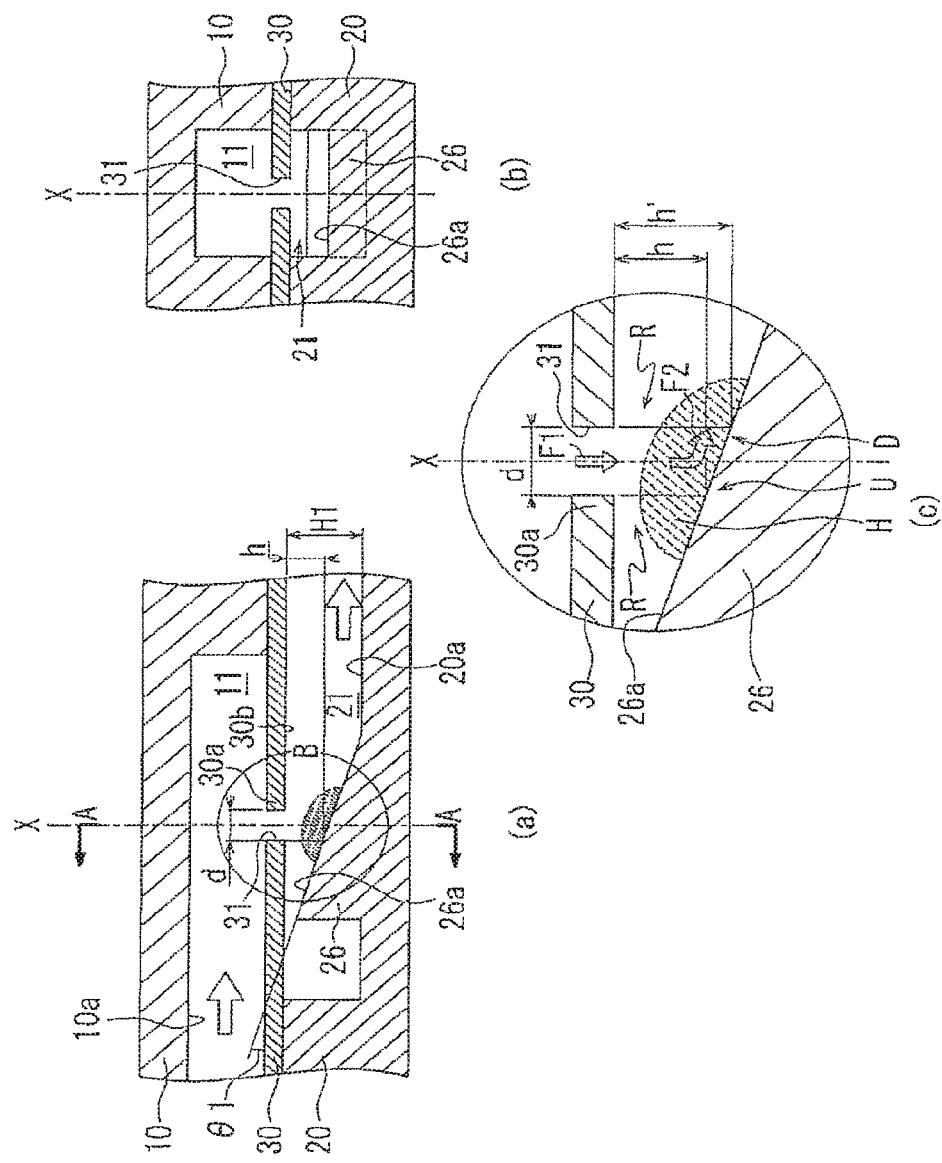
FIG. 4 is a sectional view showing a third embodiment of the control valve body structure according to the present invention.

Next, as a third embodiment, the other example of the protruding section in the downstream side oil passage will be explained. FIG. 4 is a drawing for explaining the protruding section according to the third embodiment. FIG. 4(a) is a sectional view of the control valve body when cut along the longitudinal direction of the oil passage 21. FIG. 4(b) is a sectional view taken along an A-A line of FIG. 4(a). FIG. 4(c) is an enlarged view of an area B of FIG. 4(a).

A protruding section 26 of this third embodiment is formed integrally with the valve body enclosure 20. The protruding section 26 is provided directly below the orifice 31 and in a predetermined area ranging from a position directly below the orifice 31 to upstream and downstream sides in a longitudinal direction (i.e. in right and left directions in FIG. 4(a)) of the channel 20a.

An opposing surface 26a of the protruding section 26, which faces to the separate plate 30, is not parallel to the separate plate 30, and has a flat inclined surface that is inclined at a predetermined angle θ1. A separation distance from the lower surface 30b of the separate plate 30 on the oil passage 21 side to the opposing surface 26a of the protruding section 26 is greater, as a position on the opposing surface 26a gets closer to the downstream side of the oil passage 21. Further, a minimum depth h from the orifice 31 to the opposing surface 26a in a part directly below the orifice 31 is set to be smaller (shallower) than the distance L that is required for the first vortex ring to be formed in the penetration direction of the orifice 31. In the same manner as the first embodiment explained above, the angle θ1 of the opposing surface 26a is set so as to satisfy the relationship of h≤3d (=L). Here, as can be seen from FIG. 4, an area of the opposing surface 26a is greater than the area of the orifice 31 having the diameter d.

In the oil passage 21 having the protruding section 26, a flow direction of the working fluid flowing into the oil passage 21 through the orifice 31 and forming the flow (an arrow F1 in FIG. 4) toward the penetration direction of the orifice 31 in the oil passage 21 is bent or curved to a downward direction of the oil passage 21 by the opposing surface 26a of the protruding section 26 (see an arrow F2). Here, in an upstream side U directly below the orifice 31 in the oil passage 21, since the minimum depth h from the orifice 31 to the opposing surface 26a is set to be smaller (shallower) than the distance L that is required for the first vortex ring to be formed in the penetration direction of the orifice 31 (i.e. h≤3d), the flow of the working fluid is disturbed before the vortex ring is generated. It is therefore possible to prevent the vortex ring from continuously appearing in the penetration direction of the orifice 31 and prevent the vortex ring from growing.

Further, as can be seen from FIG. 4(c), in a downstream side D directly below the orifice 31 in the oil passage 21, a minimum depth h' from the orifice 31 to the opposing surface 26a is greater (deeper) than the minimum depth h in the upstream side U, and the vortex ring is formed more easily than the upstream side U. However, since the opposing surface 26a is inclined so that the flow F2 of the working fluid whose moving or flowing direction is changed at the opposing surface 26a in the upstream side U crosses the downstream side D, the generation of the vortex ring in the downstream side D is inhibited by this working fluid flow F2.

Furthermore, since the working fluid passing through the orifice 31 hits against or strikes the opposing surface 26a and its moving direction is changed, in the same manner as the embodiments explained above, the high pressure area H is momentarily formed directly below the orifice 31.

Then, in this condition, the flow of the working fluid that newly passes through the orifice 31 and forms the flow F1 toward the penetration direction of the orifice 31 is impeded by the high pressure until the flow of the working fluid passes through the orifice 31 and reaches the high pressure area H, and its flow velocity decreases. With this working, since the flow velocity difference between the working fluid around the orifice 31 and the working fluid passing through the orifice 31 becomes small, the influence by the working fluid passing through the orifice 31 is lessened. Thus, even if the vortex flow is generated, it is generation of the weak or poor vortex.

Consequently, even if the vortex ring is continuously formed on the extended line of the orifice 31 in the oil passage 21, since the pressure difference between the core of the vortex ring and the segment between contiguous vortex rings becomes small as compared with the case where the high pressure area H is not formed, the pressure on the lower surface 30b side of the separate plate 30 is inhibited from periodically widely fluctuating in the up-and-down directions. It is therefore possible to suppress the vibration of the section 30a of the separate plate 30, which is adjacent to the orifice 31, and suppress the generation of the noise resulting from the vibration of the separate plate 30.

As explained above, the protruding section 26 having the opposing surface 26a that is inclined with respect to the separate plate 30 is formed directly below the orifice 31 and in its vicinity in the channel 20a, and the depth h from the orifice 31 (the lower surface 30b of the separate plate 30) to the opposing surface 26a is greater, as the position on the opposing surface 26a gets closer to the downstream side of the oil passage 21. Further, the relationship between the minimum depth h from the orifice 31 to the opposing surface 26a in the part directly below the orifice 31 and the diameter d of the orifice 31 is set so as to satisfy the relationship of h≤3d (=L), then the depth h is set to be smaller than or equal to the distance L that is required for the first vortex ring to be formed in the penetration direction of the orifice 31.

Also with this structure, since the vortex ring is prevented from being continuously formed in the penetration direction of the orifice 31 and the pressure of the area R adjacent to the orifice 31 of the separate plate 30 is inhibited from periodically fluctuating in the up-and-down directions in the downstream side oil passage 21, the generation of the noise caused by the fact that the section 30a of the separate plate 30, which is adjacent to the orifice 31, vibrates can be prevented.

Here, in each of the embodiments described above, as the example, the case where the shape of the orifice 31 is such circular shape that a distance from the center axis X is the same is explained. Meanwhile, simulation and an experimental result about the vortex ring formed in the downstream side oil passage showed that the shape of the orifice 31 also has an influence on the formation of the vortex ring, and if a flow of the working fluid that is faster than that around the orifice 31 is formed a predetermined distance X or more along the penetration direction (a center axis X direction) of the orifice 31 directly below the orifice 31 by the working fluid passing through the orifice 31, the vortex ring is continuously generated.

Thus, as modifications of the above-mentioned orifice shape, shapes of the orifice which can suppress the generation of the vortex ring will be explained here.

Figure 5:
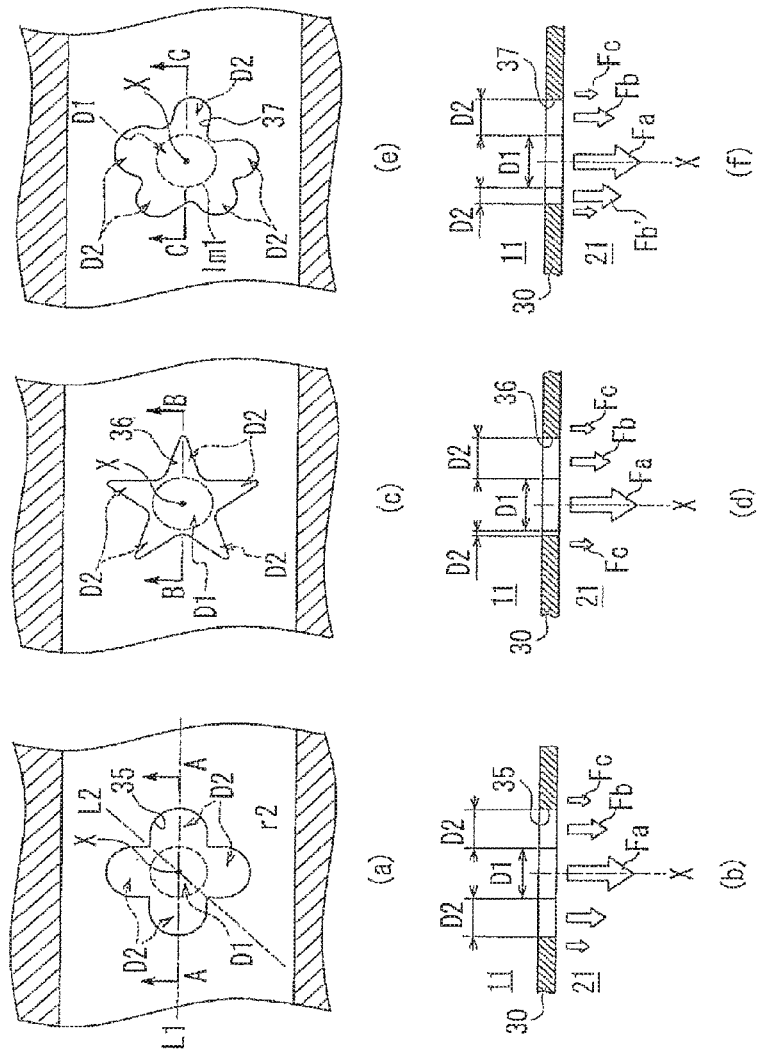
FIG. 5 is a sectional view showing some modifications of the control valve body structure as a fourth embodiment of the present invention.

FIG. 5 is a drawing for explaining the shape of the orifice and a speed (the velocity) of the working fluid in the downstream side oil passage. FIG. 5(a) is a drawing for explaining an orifice 35 having a substantially cruciform shape. FIG. 5(c) is a drawing for explaining an orifice 36 having an almost star shape. FIG. 5(e) is a drawing for explaining an orifice 37 having the other shape. FIGS. 5(b), 5(d) and 5(f) are drawings that show the speed (the velocity) of the flow of the working fluid formed in the downstream side oil passage by sizes of arrows. As can be appreciated from FIG. 5, it can be understood that each of the orifices 35, 36 and 37 shown in FIGS. 5(a), 5(c) and 5(e) is comprehensively an orifice whose plane shape is noncircular and has a substantially inner tooth shape.

The orifice 35 shown in FIG. 5(a) has such shape that two long holes whose both ends have an R-shape are arranged with a phase of one of the two long holes shifted by 90 degrees on the center axis X, which is the substantially cruciform shape viewed from above.

In a case of the orifice 35 having this shape, a velocity difference, which results from the passage cross-sectional area, between the working fluid passing through a middle area D1 where the two long holes cross and the working fluid passing through a peripheral area D2 that encloses the middle area D1 arises. A flow velocity of a flow Fa of the working fluid passing through the middle area D1 is higher than that of a flow Fb of the working fluid passing through the peripheral area D2.

Here, the generation and the growth of the vortex ring become noticeable when the velocity difference between the working fluid flowing directly below the orifice 35 and the working fluid flowing outside the area positioned directly below the orifice 35 is great. In the case of the orifice 35, when looking at the flow of the working fluid in cross section of the line L1 (in cross section of the line L1, passing along the center axis X), the flow velocities Fa and Fb of the working fluid are lower from a middle of the orifice 35 toward a vicinity of the orifice 35. Then, a difference from a flow velocity Fc of the working fluid flowing outside the area positioned directly below the orifice 35 becomes small (Fa>Fb>Fc). Therefore, the generation and the growth of the vortex ring in the oil passage 21 located on the downstream side of the orifice 35 can be suppressed as compared with the orifice 31 of the above embodiments.

Further, in a cross section of a line L2 (in a cross section of the line L2, passing along the center axis X), since the peripheral area D2 is not present, the flow velocity difference between the flow Fa of the working fluid flowing directly below the orifice 35 and the flow Fc of the working fluid flowing outside the area positioned directly below the orifice 35 is still large. Meanwhile, regarding the flow velocity difference between the flow of the working fluid flowing at the part positioned directly below the orifice 35 and the flow Fc of the working fluid flowing outside the area positioned directly below the orifice 35, a large flow velocity difference part (the cross section of the line L1) and a small flow velocity difference part (the cross section of the line L2) are alternately positioned on the center axis X of the orifice 35. Then, the flow velocity difference becomes small as compared with the above embodiments. Thus, the generation and the growth of the vortex ring can be suppressed as compared with the orifice 31 of the above embodiments.

In addition, by setting the flow velocity difference so that the flow velocity difference between the flow of the working fluid flowing directly below the orifice 35 and the flow of the working fluid flowing outside the area positioned directly below the orifice 35 is different according to an angle position on the center axis X of the orifice 35, an annular vortex ring whose core is positioned at the center axis X is not easily formed in the downstream side of the oil passage 21. Here, even if the vortex ring appears, since the vortex ring is not circular, the shape of the vortex ring changes due to an inductive speed of the vortex, and its secondary generation is lost or extinguished. Thus, a change or fluctuation of a force acting on the separate plate 30 is lessened. Also with these workings, since the pressure of the area R adjacent to the orifice 35 of the separate plate 30 can be inhibited from periodically fluctuating in the up-and-down directions, the generation of the noise caused by the fact that the section 30a of the separate plate 30, which is adjacent to the orifice 35, vibrates can be prevented.

As explained above, by employing the substantially cruciform-shaped orifice 35 having such shape that the two long holes whose both ends have the R-shape are arranged with the phase of one of the two long holes shifted by 90 degrees on the center axis X, the generation and the growth of the vortex ring in the downstream side oil passage 21 can be suppressed. Then, the pressure of the area R adjacent to the orifice 35 of the separate plate 30 can be inhibited from periodically fluctuating in the up-and-down directions, and the generation of the noise caused by the fact that the section 30a of the separate plate 30, which is adjacent to the orifice 35, vibrates can be prevented.

The orifice 36 shown in FIG. 5(c) has the almost star shape viewed from above. Also in the case of the orifice 36 having this shape, a velocity difference, which results from the passage cross-sectional area, between the working fluid passing through a middle area D1 and the working fluid passing through a peripheral area D2 that encloses the middle area D1 arises. Then, as shown in FIG. 5(d), in a part where the peripheral area D2 is provided in an area positioned directly below the orifice 36, a difference from a flow velocity Fc of the working fluid flowing outside the area positioned directly below the orifice 36 becomes small (Fa>Fb>Fc). Therefore, the generation and the growth of the vortex ring in the oil passage 21 located on the downstream side of the orifice 36 can be suppressed as compared with the orifice 31 of the above embodiments.

As explained above, also by employing the orifice 36 having the star shape viewed from a direction orthogonal to the separate plate 30 and by forming an opening of the orifice 36 by the middle area D1 located on a center axis X of the orifice 36 and the peripheral area D2 located around the middle area D1 with the peripheral area D2 arranged at a predetermined interval in a circumferential direction of the center axis X, the generation and the growth of the vortex ring in the downstream side oil passage 21 can be suppressed.

In the case of the orifice 37 shown in FIG. 5(e), a plurality of peripheral areas D2 are formed so that the peripheral areas D2 extend from a circumference of a middle area D1 formed by an imaginary circle Im1 in a direction moving away from the imaginary circle Im1. Each peripheral area D2 has a different passage cross-sectional area, and is arranged at random on a center axis X of the orifice 37.

Therefore, different flow speeds (different flow velocities) (flows Fb, Fb') exist around a middle area (a flow Fa) whose flow speed (flow velocity) is highest, and an area whose flow velocity is lower than the flow Fa and is higher than the flow Fc of the working fluid flowing outside the area positioned directly below the orifice 37 is formed at random. Also in the case of the orifice 37 having the shape shown in FIG. 5(e), the generation and the growth of the vortex ring in the oil passage 21 located on the downstream side of the orifice 37 can be suppressed as compared with the orifice 31 of the above embodiments.

Here, the orifice 35, 36 or 37 shown in FIG. 5 could be combined with the control valve body 1 having the protruding section 22, 25 or 26 of the above embodiments. Also with this combination, it is possible to prevent the vortex ring from being continuously formed in an orthogonal direction of the orifice.

The invention claimed is:

1. A structure of a control valve body configured to guide working fluid, comprising:
   valve body enclosures coupled together to form the control valve body, the valve body enclosures having channels on opposing surfaces thereof;
   a separate plate sandwiched between the valve body enclosures, the separate plate defining oil passages on both sides of the separate plate by separating the channels between the valve body enclosures;
   an orifice provided at the separate plate, the oil passages on both sides of the separate plate, which are an upstream side oil passage and a downstream side oil passage respectively located on an upstream side and a downstream side of the separate plate, communicating with each other through the orifice,
   a depth h, at least in a part facing to the orifice, of the channel corresponding to the downstream side oil passage being set to be shallower than a depth of the channel corresponding to the upstream side oil passage,
   the depth h of the channel in the part facing to the orifice and a diameter d of the orifice being set so as to satisfy a relationship of h≤3d, and
   the valve body enclosure, in which the channel having the depth h in the part facing to the orifice is formed, being provided, in the part facing to the orifice, with a circular truncated cone-shaped protruding section structured to guide a flow of the working fluid with respect to the orifice,
   wherein the separate plate and the circular truncated cone-shaped protruding section are physically positioned to maintain a separation between the separate plate and the circular truncated cone-shaped protruding section.

2. The structure of the control valve body as claimed in claim 1, wherein:
   the valve body enclosure in which the channel having the depth h in the part facing to the orifice is formed is provided with a protruding section that faces to the separate plate where the orifice is formed, and
   the protruding section has an opposing surface that faces to the orifice.

3. The structure of the control valve body as claimed in claim 2, wherein:
   the opposing surface formed at the protruding section is a surface that is parallel to the separate plate where the orifice is formed.

4. The structure of the control valve body as claimed in claim 3, wherein:
   an area of the opposing surface is greater than an area of the orifice having the diameter d.

5. The structure of the control valve body as claimed in claim 1, wherein:
   a top portion flat surface section of the protruding section is parallel to the separate plate where the orifice is formed, and an area of the top portion flat surface section of the protruding section is smaller than an area of the orifice having the diameter d.

* * * * *